US012504325B2

(12) United States Patent
Mong et al.

(10) Patent No.: US 12,504,325 B2
(45) Date of Patent: Dec. 23, 2025

(54) AUTOMATED OPTICAL MEASUREMENT SYSTEM AND METHOD FOR NEAR EYE DISPLAY

(71) Applicant: CHROMA ATE INC., Taoyuan (TW)

(72) Inventors: Hong-Yau Mong, Taoyuan (TW); Tsung-Hsien Ou, Taoyuan (TW); Yu-Shuan Lin, Taoyuan (TW); Shih-Yao Pan, Taoyuan (TW); Shih-Min Hsu, Taoyuan (TW)

(73) Assignee: CHROMA ATE INC., Taoyuan (TW)

( * ) Notice: Subject to any disclaimer, the term of this patent is extended or adjusted under 35 U.S.C. 154(b) by 0 days.

(21) Appl. No.: 18/659,429

(22) Filed: May 9, 2024

(65) Prior Publication Data

US 2024/0426656 A1 Dec. 26, 2024

(30) Foreign Application Priority Data

Jun. 20, 2023 (TW) ................................ 112123116

(51) Int. Cl.
| | |
|---|---|
| *G01J 1/44* | (2006.01) |
| *G01J 3/50* | (2006.01) |
| *G09G 3/00* | (2006.01) |
| *H04N 23/67* | (2023.01) |
| *G01J 1/42* | (2006.01) |

(52) U.S. Cl.
CPC ................ *G01J 1/44* (2013.01); *G01J 3/506* (2013.01); *G09G 3/001* (2013.01); *H04N 23/673* (2023.01); *G01J 2001/4247* (2013.01)

(58) Field of Classification Search
CPC ...... G01J 1/44; G01J 2001/4247; G01J 3/506; G09G 3/001; H04N 23/673
See application file for complete search history.

(56) References Cited

U.S. PATENT DOCUMENTS

| | | | | |
|---|---|---|---|---|
| 10,075,685 | B1* | 9/2018 | Fulghum | H04N 9/3191 |
| 10,171,725 | B1* | 1/2019 | Nahum | G03B 13/36 |
| 10,430,939 | B1* | 10/2019 | Levin | G02B 27/62 |
| 10,497,295 | B1* | 12/2019 | Jia | G02B 27/017 |
| 10,714,055 | B1* | 7/2020 | Strasdat | G06F 3/0346 |
| 10,929,997 | B1* | 2/2021 | Hall | G01B 11/2513 |

(Continued)

FOREIGN PATENT DOCUMENTS

| | | |
|---|---|---|
| CN | 107884160 A | 4/2018 |
| CN | 113125114 A | 7/2021 |

(Continued)

*Primary Examiner* — Peter D Le

(74) *Attorney, Agent, or Firm* — Birch, Stewart, Kolasch & Birch, LLP

(57) ABSTRACT

An automated optical measurement system and method for a near eye display are provided. A controller first controls the near eye display to display a specific pattern, then controls a displacement generation module to drive an image sensing module toward or away from an imaging module, and controls the image sensing module to capture the specific pattern to obtain focus images; and the controller performs focusing according to the focus images. Finally, the controller measures an optical characteristic of the near eye display. Accordingly, the focusing method used is to capture the specific pattern displayed by the near eye display while moving the image sensing module, and perform automatic focusing by comparing the capture results.

4 Claims, 4 Drawing Sheets

(56) References Cited

U.S. PATENT DOCUMENTS

| | | | | |
|---|---|---|---|---|
| 2011/0025988 A1* | 2/2011 | Haraguchi | ........... | H04N 9/3194 |
| | | | | 353/70 |
| 2014/0125859 A1* | 5/2014 | Jung | ...................... | H04N 23/69 |
| | | | | 348/347 |
| 2014/0184475 A1* | 7/2014 | Tantos | ........... | H04N 21/234318 |
| | | | | 345/8 |
| 2022/0377312 A1 | 11/2022 | Samples et al. | | |

FOREIGN PATENT DOCUMENTS

| | | | |
|---|---|---|---|
| TW | 201839459 A | 11/2018 | |
| TW | M648202 U | 11/2023 | |
| WO | WO 2022/204029 A1 | 9/2022 | |

* cited by examiner

AUTOMATED OPTICAL MEASUREMENT SYSTEM AND METHOD FOR NEAR EYE DISPLAY

CROSS-REFERENCE TO RELATED APPLICATION

This non-provisional application claims priority under 35 U.S.C. § 119(a) to Patent Application No. 112123116 filed in Taiwan, R.O.C. on Jun. 20, 2023, the entire contents of which are hereby incorporated by reference.

BACKGROUND

Technical Field

The present disclosure relates to an automated optical measurement system and method for a near eye display, and in particular, to a testing device for a wearable near eye display such as AR, VR, MR, and XR, and specifically, to testing of optical characteristics.

Related Art

Near eye displays (NEDs) have been developed maturely, and are gaining increasing acceptance in the market. For example, wearable devices such as augmented reality (AR), virtual reality (VR), and mixed reality (MR) are gradually becoming popular.

However, quality testing of optical characteristics of the near eye displays has always been a challenge for major manufacturers. The main reason for this is that near eye displays are designed to accommodate different visual conditions of wearers, such as myopia, hyperopia, or normal vision, allowing for settings with different diopters for display. Therefore, testing of the optical characteristics under different diopter conditions is an indispensable part of the quality testing. However, this directly increases the complexity of the testing.

In terms of a conventional testing method, under different diopter conditions, focusing is manually performed first, and then testing of various optical characteristics is performed. However, the conventional manual method is highly uncertain, consumes human resources, and is costly and inefficient.

In addition, the patent document No. WO2022204029 uses a commercially available camera lens with autofocus capabilities. However, this commercially available lens is not specifically designed for the near eye displays, which may result in suboptimal imaging quality and questionable accuracy of measurement results. Additionally, in terms of hardware design, integrating commercially available lenses into testing equipment may increase the overall volume and require additional installation components, leading to high construction costs or directly impacting testing efficiency

SUMMARY

A main objective of the present disclosure is to provide an automated optical measurement system and method for a near eye display, aiming to replace or simulate manual testing of imaging quality of the near eye display. By projecting images under different diopter conditions, rapid auto-focusing of a measurement instrument that simulates human eyes can be achieved, so that the testing efficiency can be significantly improved and excellent optical image quality can be obtained.

In order to achieve the above objective, an automated optical measurement system for a near eye display of the present disclosure mainly includes an imaging module, an image sensing module, a displacement generation module, and a controller. The imaging module is configured to face the near eye display; the image sensing module is connected to the imaging module; the displacement generation module is adapted to displace the image sensing module in at least one dimension direction; and the controller is electrically connected to the near eye display, the image sensing module, and the displacement generation module. The controller controls the near eye display to display a specific pattern; the controller controls the image sensing module to capture the specific pattern to obtain at least one focus image; and the controller controls the displacement generation module according to the focus image to drive the image sensing module toward or away from the imaging module to perform focusing.

In order to achieve the above objective, an automated optical measurement method for a near eye display of the present disclosure mainly includes the following steps: first, a controller controls the near eye display to display a specific pattern; then, the controller controls a displacement generation module to drive an image sensing module toward or away from an imaging module, and controls the image sensing module to separately capture the specific pattern to obtain a plurality of focus images, where the imaging module is between the near eye display and the image sensing module; the controller performs focusing according to the plurality of focus images; and next, the controller controls and measures an optical characteristic of the near eye display.

Accordingly, in conducting optical characteristic tests, the present disclosure employs a focusing method that involves moving the image sensing module while simultaneously capturing a specific pattern displayed by the near eye display, and locate a focusing position by comparing the capture results (focus images). However, this mechanism can achieve rapid autofocusing, is applicable to any diopter condition, and applicable to all types of near eye displays, and can greatly improve the testing efficiency and the testing accuracy.

On the other hand, since a moving component that performs focusing is the image sensing module, and since a focal length range of the image can be significantly reduced after the image passes through the imaging module, a moving distance for auto-focusing of the image sensing module can be shortened significantly. Since the image sensing module is small in volume and light in weight, the displacement generation module can be miniaturized, and the overall volume of the measurement system can be more compact. In addition, the present disclosure can use a dedicated imaging module designed for the near eye display, so that the excellent optical image quality can be obtained throughout the testing process, which is beneficial to improving the testing quality and the testing efficiency.

DETAILED DESCRIPTION

Figure 1:
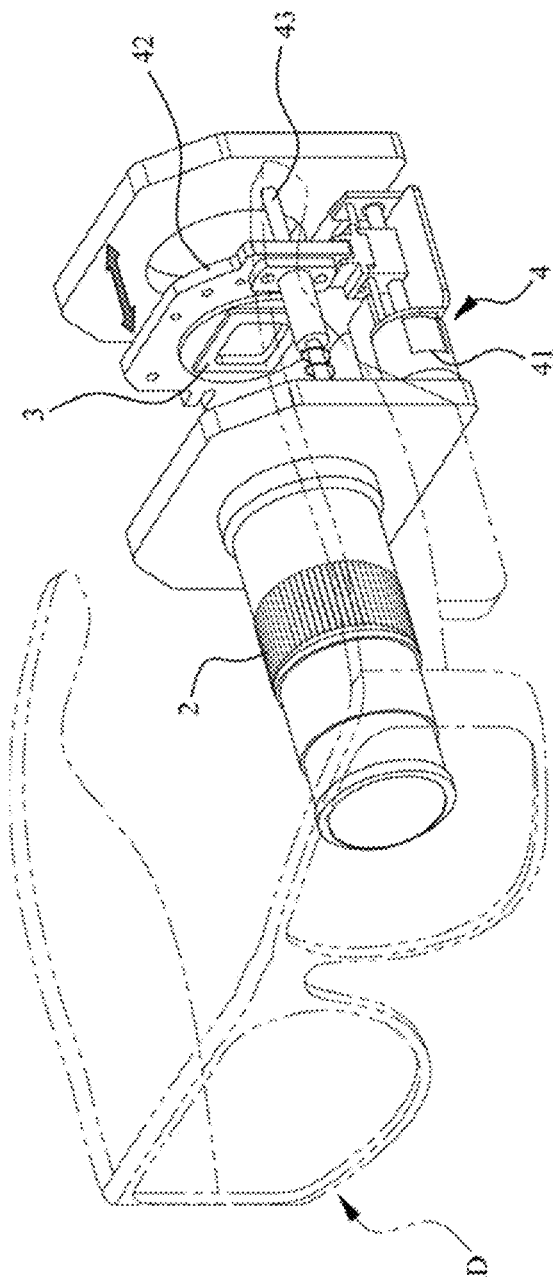
FIG. 1 is a schematic diagram of a system according to an embodiment of the present disclosure.

Before an automated optical measurement system and method for a near eye display of the present disclosure are described in detail in this embodiment, it should be noted that in the following description, similar components are represented by the same component symbols. In addition, drawings of the present disclosure are for schematic illustration only, which are not necessarily drawn to scale, and not all details are necessarily presented in the drawings.

First, a near eye display D of this embodiment is described using AR glasses as an example. However, the present disclosure is not limited thereto. Other near eye displays such as VR, MR, and XR are applicable to the present disclosure.

Figure 2A:
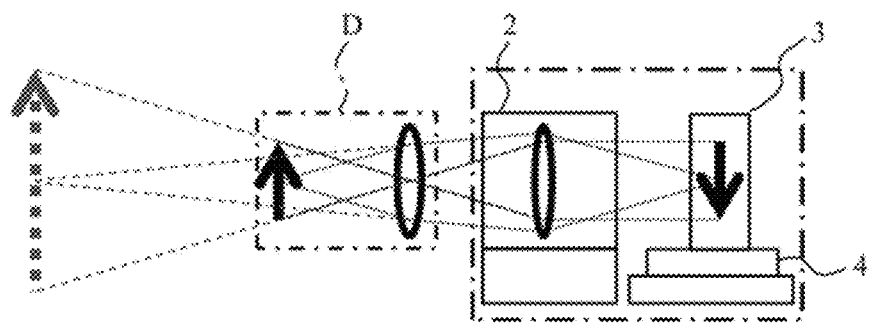
FIG. 2A is a schematic diagram of an optical path according to an embodiment of the present disclosure.
Figure 2B:
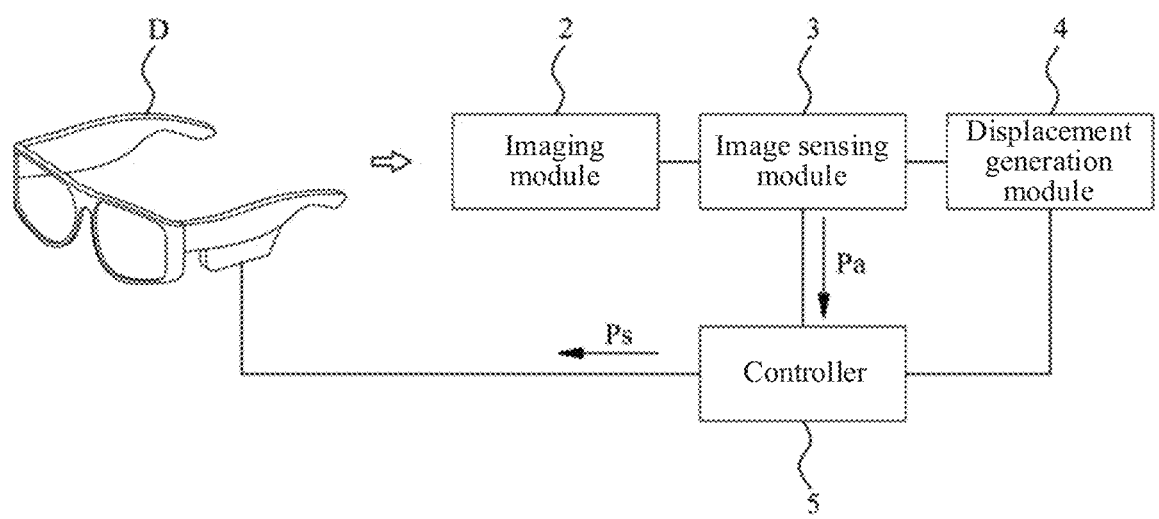
FIG. 2B is an architectural diagram of a system according to an embodiment of the present disclosure.

Referring to FIG. 1, FIG. 2A, and FIG. 2B together, FIG. 1 is a schematic diagram of a system according to an embodiment of the present disclosure, FIG. 2A is a schematic diagram of an optical path according to an embodiment of the present disclosure, and FIG. 2B is an architectural diagram of a system according to an embodiment of the present disclosure. As shown in the figures, this embodiment mainly includes an imaging module 2, an image sensing module 3, a displacement generation module 4, and a controller 5. One end of the imaging module 2 is configured to face the near eye display D, and the other end is adjacent to the image sensing module 3. The displacement generation module 4 is configured to carry the image sensing module 3 and is adapted to displace the image sensing module 3 in at least one dimension direction. The controller 5 is electrically connected to the near eye display D, the image sensing module 3, and the displacement generation module 4.

In addition, the imaging module 2 may include optical components such as a macro lens, a baffle, an aperture assembly, and an eyepiece. It should be noted that the imaging module 2 of the present disclosure is a dedicated lens module, which is specially configured for optical characteristics of different to-be-tested objects (i.e., the near eye display D), such as a dedicated imaging module 2 designed for AR glasses or VR glasses, or even dedicated imaging modules 2 designed for the near eye displays D of different manufacturers. However, the imaging module 2 of this embodiment is an optical lens module specially designed for the AR glasses.

Further, since a display in the AR glasses is configured to only present information in a small portion of a user's field of view (FOV), the imaging module 2 designed for measuring AR glasses displays is mostly a small angle field of view (For example, ±20 degrees). However, the VR glasses are exactly the opposite. Since the displays in VR glasses are usually configured to fill the user's field of view as much as possible, so that the user can be immersed in it, the field of view is usually selected with a fairly large angle Accordingly, the present disclosure adopts a dedicated imaging module 2 for the optical characteristics of different to-be-tested objects (that is, the near eye display D). Therefore, excellent optical image quality can be obtained during the entire testing stage, which is beneficial to improving the testing quality and the testing efficiency, and the volume of the entire system can be further reduced.

In addition, the image sensing module 3 may include a CCD or CMOS sensor that captures images and related measurement instruments for testing of optical characteristics, such as a photometer and a colorimeter. Further, the displacement generation module 4 of this embodiment mainly includes an actuator 41, a carriage 42, and a guide rod 43. The image sensing module 3 is configured on the carriage 42, the carriage 42 is slidably mounted on the guide rod 43, and the actuator 41 is operatively connected to the carriage 42. Accordingly, the actuator 41 can drive the carriage 42 to slide forward and backward. However, since the focal length range of the image is significantly reduced after the image passes through the imaging module 2, the sliding range of the slide 42 is only between 2 and 5 centimeters in different extreme refractive power cases. Therefore, the size of the displacement generation module 4 can be quite compact.

The controller 5 of this embodiment may be a desktop computer, a notebook computer, a tablet computer, an industrial computer, a server, or other computer devices with a data processing function; The controller 5 is electrically connected to the near eye display D, the image sensing module 3, and the displacement generation module 4, and controls the operation of these components.

Figure 3:
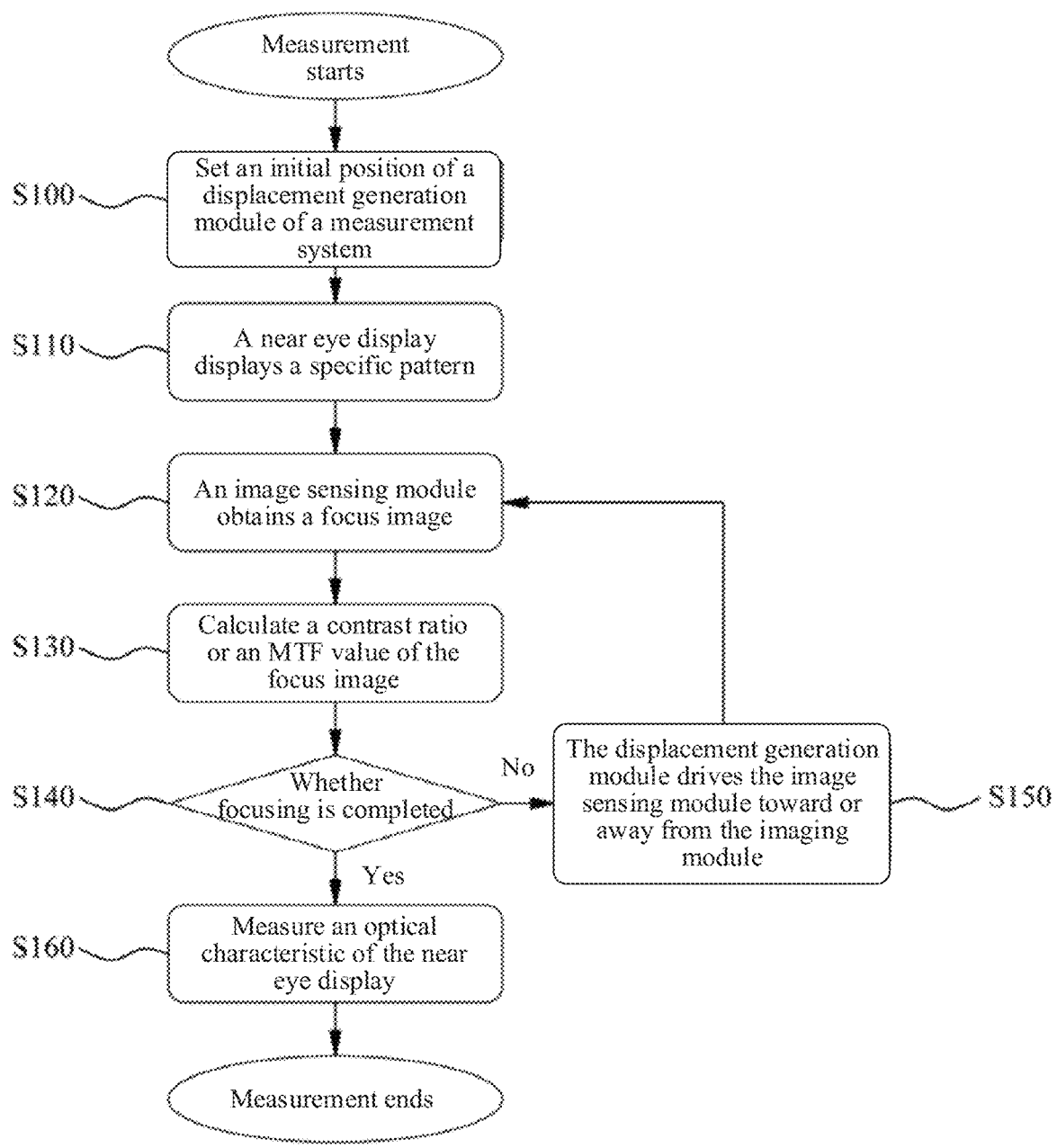
FIG. 3 is a measurement flowchart according to an embodiment of the present disclosure.

The following describes an operation process of this embodiment. Refer to FIG. 3 together, which is a measurement flowchart according to an embodiment of the present disclosure. First, the near eye display D (AR glasses) is set up in front of the eyepiece of the imaging module 2. Then, the controller 5 sets an initial position of the displacement generation module 4, also referred to as position zeroing, which is step S100. This ensures that the displacement generating module 4 can accurately move the image sensor module 3 in subsequent displacement operations. Next, in step S110, the controller 5 controls the near eye display D to display a specific pattern Ps. The specific pattern Ps is related to the subsequent focusing comparison technical solution, which will be described in detail later. In step S120, the controller 5 first controls the image sensing module 3 to capture the specific pattern Ps to obtain at least one focus image Pa.

Next, in step S130, a contrast analysis focusing method and an MTF value analysis focusing method are provided below. In the contrast analysis focusing method, the specific pattern Ps includes a plurality of black and white stripes, and the controller 5 calculates a contrast ratio of the captured focus image Pa, where the contrast ratio is calculated using the formula: contrast ratio=(Lmax−Lmin)/(Lmax+Lmin), where Lmax is a maximum brightness value in the focus image Pa, and Lmin is a minimum brightness value in the focus image Pa. In step S140, the controller 5 determines whether a calculated contrast ratio value reaches an optimal focusing value.

If the optimal focusing value has not been reached, step S150 is performed. In this step, the controller 5 controls the displacement generation module 4 to drive the image sensing module 3 toward or away from the imaging module 2, and then re-obtains the focus image Pa and calculates its contrast ratio. This process involves repeating steps S120, S130, S140, and S150. If the contrast ratio value reaches the optimal focusing value, a focusing process is completed and then step S160 is performed, that is, the controller 5 controls the related measurement instruments to measure the optical characteristics of the near eye display D, including but not limited to imaging quality, color brightness, accommodation distance (AID), virtual image distance (VID), and binocular refractive power of the near eye display.

On the other hand, in the MTF value analysis focusing method, the specific pattern includes a high-contrast slanted edge pattern, but is not limited to this pattern. Other patterns that can present high contrast, such as a cross pattern, may also be applicable. The controller 5 calculates an MTF (Modulation Transfer Function) value of the captured focus image Pa. The calculation formula is MTF=M*/M, where M is the contrast ratio of the specific pattern Ps, and M* is the contrast ratio of the focus image Pa. As for the focusing method, as described in the contrast ratio analysis focusing method above, steps S120, S130, S140, and S150 are repeated until the MTF value of the focus image Pa reaches the optimal focusing value.

It is worth mentioning that in the contrast ratio analysis focusing method, a pitch period of the projected black and white stripes needs to be varied according to different spatial frequencies; while in the MTF value analysis focusing method, only slanted edge stripes with a fixed spacing need to be projected, and any spatial frequency can be selected for calculation. More simply, compared with the contrast ratio analysis focusing method, the MTF value analysis focusing method has the advantage of being capable of generating any spatial frequency value with a single calculation. Therefore, it offers greater flexibility in application.

Figure 4A:
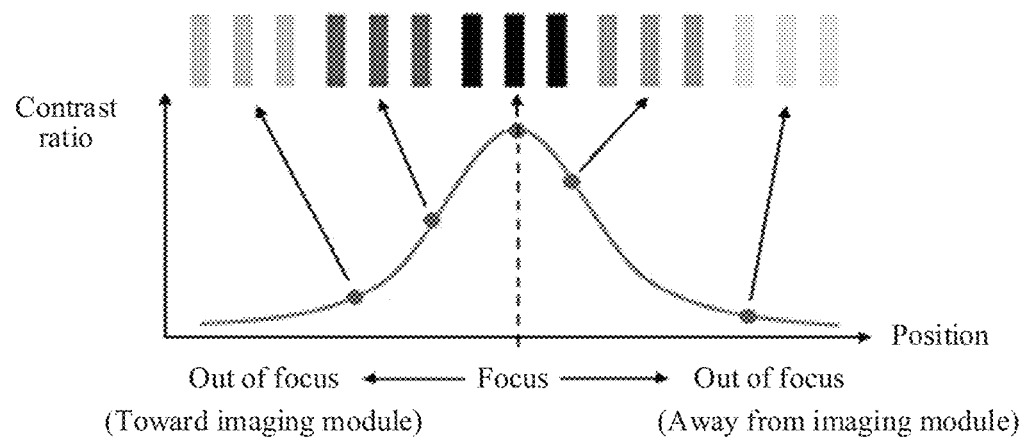
FIG. 4A is a focus curve diagram using contrast ratio analysis according to an embodiment of the present disclosure.
Figure 4B:
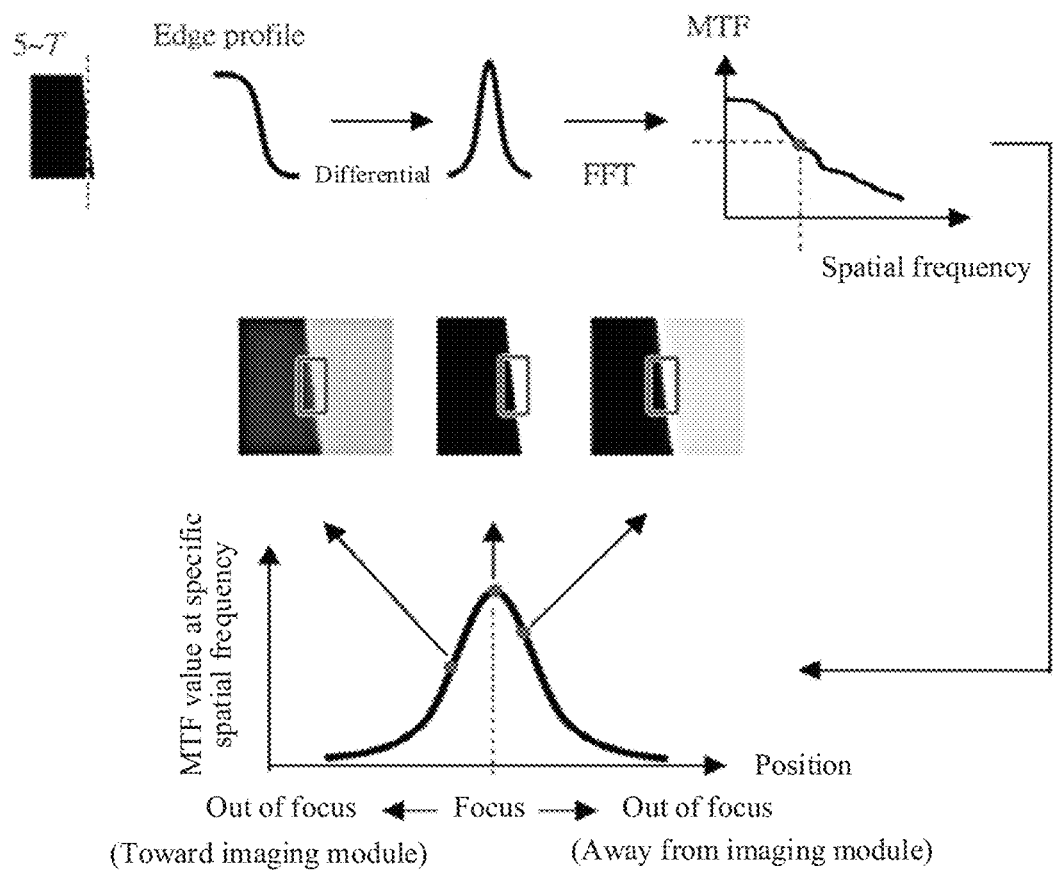
FIG. 4B is a focus curve diagram using MTF value analysis according to an embodiment of the present disclosure.

In addition, this embodiment further provides the following variant. Refer to FIG. 4A first, which is a focus curve diagram using contrast ratio analysis according to an embodiment of the present disclosure. The controller 5 controls the displacement generation module 4 to drive the image sensing module 3 to move at different positions, which can be adopted in a stepping mode, and to obtain a plurality of focus images Pa. The controller 5 calculates the contrast ratios of the plurality of focus images and obtains a focus curve. The controller 5 determines a peak value of the focus curve, which is an optimal focusing position. Subsequently, the controller 5 controls the displacement generation module 4 to drive the image sensing module 3 to be located at the position corresponding to the peak value, and the focusing is completed Further, regarding the variant of the MTF value analysis focusing method, similarly, the controller 5 controls the displacement generation module 4 to drive the image sensing module 3 to move at different positions to obtain a plurality of focus images Pa, and calculates the MTF values to obtain a focus curve. See the upper part of FIG. 4B. The specific method involves obtaining a line spread function based on the edge information of the high-contrast slanted edge pattern through differential processing, followed by FFT (Fast Fourier Transform) computation, which yields a curve waveform of MTF values and spatial frequencies (shown in the upper part of FIG. 4B). This is then transformed into the final focusing curve (shown in the lower part of FIG. 4B), where the peak value of this focusing curve represents the optimal focusing position.

The foregoing embodiments are examples for facilitating description, and the scope of right claimed by the present disclosure shall be subject to the claims, and is not limited to the foregoing embodiments only.

What is claimed is:

1. An automated optical measurement system for a near eye display, comprising:
   an imaging module, configured to face the near eye display;
   an image sensing module, connected to the imaging module;
   a displacement generation module, adapted to displace the image sensing module in at least one dimension; and
   a controller, electrically connected to the near eye display, the image sensing module, and the displacement generation module,
   wherein the controller is configured to:
   control the near eye display to display a specific pattern comprising a high-contrast slanted edge pattern;
   control the displacement generation module to drive the image sensing module to a plurality of positions relative to the imaging module; and
   control the image sensing module to capture the specific pattern at each of the plurality of positions to obtain a plurality of focus image; and
   perform a focusing process by:
   obtaining a line spread function from the plurality of focus images based on edge information of the high-contrast slanted edge pattern via differential processing;
   calculating Modulation Transfer Function (MTF) values by performing a Fast Fourier Transform (FFT) on the line spread function, thereby generating a curve waveform representing the Modulation Transfer Function values versus spatial frequency;
   transforming the curve waveform into a focus curve; and
   determining a peak of the focus curve and controlling the displacement generation module to drive the image sensing module to a position corresponding to the peak.

2. The automated optical measurement system according to claim 1, wherein the controller further controls the image sensing module to measure at least one of imaging quality, color brightness, accommodation distance (AID), virtual image distance (VID), and binocular refractive power of the near eye display.

3. An automated optical measurement method for a near eye display, comprising the following steps:
   (A) controlling, by a controller, the near eye display to display a specific pattern comprising a high-contrast slanted edge pattern;
   (B) performing, by the controller, a focusing process, the focusing process comprising:
   controlling a displacement generation module to drive an image sensing module to a plurality of positions relative to an imaging module;
   controlling the image sensing module to capture the specific pattern at the plurality of positions to obtain a plurality of focus images, wherein the imaging module is between the near eye display and the image sensing module;
   obtaining a line spread function from the plurality of focus images based on edge information of the high-contrast slanted edge pattern via differential processing;
   calculating Modulation Transfer Function (MTF) values by performing a Fast Fourier Transform (FFT) on the line spread function, thereby generating a curve waveform representing the Modulation Transfer Function values versus spatial frequency;
   transforming the curve waveform into a focus curve; and
   determining a peak of the focus curve and controlling the displacement generation module to drive the image sensing module to a position corresponding to the peak; and
   (C) measuring, by the controller, an optical characteristic of the near eye display using the image sensing module positioned at the position corresponding to the determined peak.

4. The automated optical measurement method according to claim 3, wherein in step (C), the optical characteristic comprises at least one of imaging quality, color brightness, accommodation distance (AID), virtual image distance (VID), and binocular refractive power of the near eye display.

* * * * *